(12) United States Patent
Rubino

(10) Patent No.: US 9,416,828 B2
(45) Date of Patent: Aug. 16, 2016

(54) PIN AND PAWL STYLE BI-DIRECTIONAL OVERRUNNING CLUTCH

(75) Inventor: Marcos T. Rubino, Dearborn Heights, MI (US)

(73) Assignee: Warner Electric Technology LLC, Braintree, MA (US)

( * ) Notice: Subject to any disclaimer, the term of this patent is extended or adjusted under 35 U.S.C. 154(b) by 514 days.

(21) Appl. No.: 13/425,012

(22) Filed: Mar. 20, 2012

(65) Prior Publication Data

US 2013/0248313 A1     Sep. 26, 2013

(51) Int. Cl.
*F16D 41/16*     (2006.01)

(52) U.S. Cl.
CPC ...................... *F16D 41/16* (2013.01)

(58) Field of Classification Search
CPC ............ F16D 41/16; F16D 2041/0603; F16D 2041/0605; F16D 2041/0608; F16D 41/084; F16D 41/125; F16D 41/14
USPC .............. 192/43.1, 41 A, 47, 84.3, 84.8, 69.3
See application file for complete search history.

(56) References Cited

U.S. PATENT DOCUMENTS

| | | | |
|---|---|---|---|
| 1,472,758 A | 10/1923 | Hulett | |
| 1,547,528 A * | 7/1925 | Sears ....................... | F16D 41/14 346/139 R |
| 1,738,179 A * | 12/1929 | Foster ..................... | F16D 41/12 74/650 |
| 2,308,926 A * | 1/1943 | Kreis ............................. | 192/46 |
| 2,844,050 A | 7/1958 | Brendel | |
| 3,256,966 A * | 6/1966 | Angquist ................ | F16D 41/16 192/43.1 |
| 4,050,560 A * | 9/1977 | Torstenfelt ................. | 192/85.02 |
| 4,270,643 A | 6/1981 | Giardini | |
| 6,186,247 B1 | 2/2001 | Wang | |
| 8,042,670 B2 * | 10/2011 | Bartos et al. ................. | 192/43.1 |
| 2007/0278061 A1* | 12/2007 | Wittkopp et al. ............ | 192/43.1 |

FOREIGN PATENT DOCUMENTS

GB        GB 254176        7/1926

OTHER PUBLICATIONS

Definition of "engage": screenshot of www.merriam-webster.com/engage, taken May 4, 2015.*
International Search Report issued in corresponding International (PCT) Patent Application No. PCT/US2013/033037 (Feb. 10, 2014).
Written Opinion issued in corresponding International (PCT) Patent Application No. PCT/US2013/033037 (Feb. 10, 2014).

* cited by examiner

*Primary Examiner* — Robert Hodge
*Assistant Examiner* — Stacey Fluhart
(74) *Attorney, Agent, or Firm* — Reising Ethington P.C.

(57) ABSTRACT

An overrunning clutch is provided having inner and outer members disposed about a rotational axis with the outer member radially outward of the inner member. The clutch further includes a plurality of pins projecting from one of a radially inner surface of the outer member and a radially outer surface of the inner member. The clutch further includes one or more pawls coupled to one of the inner and outer members. Each of the pawls is movable between an engagement position wherein the pawl is engaged with one of the pins to transmit torque between the inner and outer members and a disengagement position wherein the pawl is disengaged from the pin to permit relative rotation of the inner and outer members. In one embodiment, different pawls assume their respective engagement position depending on the rotational direction of the one member.

23 Claims, 7 Drawing Sheets

PIN AND PAWL STYLE BI-DIRECTIONAL OVERRUNNING CLUTCH

BACKGROUND OF THE INVENTION a. Field of the Invention

This invention relates to an overrunning clutch. In particular, the instant invention relates to a clutch having a structure that enables improved control of clutch engagement, and smaller, more evenly distributed loads on clutch engagement surfaces.

b. Background Art

Clutches are used in many applications to selectively engage and disengage a driving device such as a motor with a driven device (e.g. a conveyor or a reel for a hose or cable) in order to transfer torque from the driving device to the driven device. In many clutches, engagement and/or disengagement occurs through electro-magnetic or fluid actuation or even manually by the user. These actuation methods increase the operating complexity and cost of the clutch. To address this drawback, in other clutches engagement and/or disengagement occurs mechanically through, for example, the use of springs and/or in response to external forces operating on the clutch such as centrifugal force.

One conventional type of clutch that relies on mechanical actuation is a centrifugal clutch. In a centrifugal clutch, a radially inner member of the clutch is coupled to the driving device. When the rotational speed of the driving device reaches a pre-determined level, shoes attached to the inner member of the clutch move radially outward against the bias of springs and engage a radially outer member of the clutch coupled to the driven member. Centrifugal clutches have several disadvantages, however. First, as the shoes engage the surface of the radially outer member, the shoes slide until the centrifugal force reaches a sufficient level to transmit torque. This sliding motion results in friction that increases temperatures within the clutch and wear on the surfaces of the clutch. The wear generates metal particles that abrade the surfaces of the clutch and cause even greater wear. Second, to achieve sufficient centrifugal force, the angular speed and mass of the shoes must be relatively high. As a result, the clutch is relatively large.

Another conventional type of clutch that relies on mechanical actuation is a ratchet and pawl clutch. In this type of clutch, pawls are brought into engagement with grooves formed in the surface of one of the clutch members either by spring loading or by centrifugal force. This type of clutch, however, also has several disadvantages. Formation of the grooves requires specialized manufacturing and heat treatment to increase material hardness thereby increasing manufacturing costs and complexity. The grooves also have sharp corners and edges that act as stress risers and reduce the clutch's strength and durability. Further, the relatively flat surfaces of the groove make it difficult to control the exact position of engagement by the pawls and, when multiple pawls are involved, it is common for one or more pawls to engage before others causing uneven load sharing. Further still, disengagement of the pawls from the grooves requires reverse relative motion between the clutch members to provide sufficient clearance. In ratchet and pawl clutches where clutch engagement results from centrifugal force, there are still further disadvantages. In particular, as rotational speed increases and the pawls move outward, it is difficult to prevent unwanted contact between the sharp edges of the pawls and the grooves and the resulting damage to both. Further, the pawls engage the surfaces of the grooves at relatively high speeds thereby generating high impact loads. To counteract these loads, the clutches tend to be relatively large and made from high strength materials thereby increasing costs.

The inventor herein has recognized a need for an overrunning clutch that will minimize and/or eliminate one or more of the above-identified deficiencies.

BRIEF SUMMARY OF THE INVENTION

An improved clutch is provided. In particular, an overrunning clutch is provided that enables improved control of clutch engagement and disengagement, and smaller, more evenly distributed loads on clutch engagement surfaces.

An overrunning clutch in accordance with one embodiment of the present invention includes an inner member disposed about a rotational axis and an outer member disposed about the rotational axis radially outward of the inner member. The clutch further includes a plurality of pins projecting from one of a radially inner surface of the outer member and a radially outer surface of the inner member. Finally, the clutch includes a pawl coupled to one of the inner and outer members. The pawl is movable between an engagement position wherein the pawl is engaged with a pin of the plurality of pins to transmit torque between the inner and outer members and a disengagement position wherein the pawl is disengaged from the pin to permit relative rotation of the inner and outer members. In one embodiment, the clutch further includes an actuator disposed between the inner and outer members and configured to engage the pawl upon rotation of the one member and urge the pawl towards the engagement position.

An overrunning clutch in accordance with another embodiment of the present invention includes an inner member disposed about a rotational axis and an outer member disposed about the rotational axis radially outward of the inner member. The clutch further includes a plurality of pins projecting from one of a radially inner surface of the outer member and a radially outer surface of the inner member. The clutch further includes a first pawl coupled to one of the inner and outer members. The first pawl is movable in response to rotation of the one member in a first rotational direction from a first disengagement position wherein the first pawl is disengaged from the plurality of pins to permit relative rotation of the inner and outer members to a first engagement position wherein the first pawl is engaged with a first pin of the plurality of pins to cause rotation of another member of the inner and outer members in the first rotational direction. The clutch further includes a second pawl coupled to the one member. The second pawl is movable in response to rotation of the one member in a second rotational direction opposite the first rotational direction from a second disengagement position wherein the second pawl is disengaged from the plurality of pins to permit relative rotation of the inner and outer members to a second engagement position wherein the second pawl is engaged with one of the first pin and a second pin of the plurality of pins to cause rotation of the another member in the second rotational direction. In accordance with one embodiment, the clutch may again further include an actuator disposed between the inner and outer members and configured to engage the first pawl upon rotation of the one member in the first rotational direction and urge the first pawl towards the first engagement position and configured to engage the second pawl upon rotation of the one member in the second rotational direction and urge the second pawl towards the second engagement position.

An overrunning clutch in accordance with the present invention is advantageous relative to conventional electrical, fluid or manually actuated clutches because the clutch is less complex and less costly. The clutch is also advantageous relative to conventional mechanically actuated clutches. As compared to conventional centrifugal clutches, no sliding friction is created thereby reducing heat and wear on the clutch. Further, because the inventive clutch is not dependent on the speed of the driving device, the clutch is smaller than conventional centrifugal clutches while transmitting the same torque. As compared to conventional ratchet and pawl clutches, the inventive clutch does not require sharp grooves in the surface of one of the clutch members nor relative motion between the clutch members to allow the pawls to clear the grooves. As a result, the clutch is easier and less costly to manufacture and suffers less stress upon engagement. Further, the pawls engage the pins at a relatively precise location thereby insuring relatively equal load sharing.

The foregoing and other aspects, features, details, utilities, and advantages of the present invention will be apparent from reading the following description and claims, and from reviewing the accompanying drawings.

DETAILED DESCRIPTION OF EMBODIMENTS OF THE INVENTION

Figure 1:
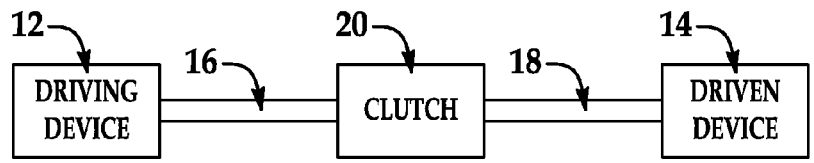
FIG. 1 is diagrammatic view of a system incorporating a clutch in accordance with the present teachings.

Referring now to the drawings wherein like reference numerals are used to identify identical components in the various views, FIG. 1 illustrates a power generation and transmission system 10. System 10 includes a driving device 12 for generating power used to drive a driven device 14. The driving device 12 may comprise a conventional motor including, for example, an electric motor, hydraulic motor or pneumatic motor. Device 12 may further include a conventional gear box or speed reducer (which may be combined with the motor to form a conventional gear motor) to control the output speed and torque delivered to driven device 14. Device 12 may output rotational torque through an output member 16 such as a shaft or another rotating body such as a gear, pulley or sprocket. Driven device 14 may comprise, for example, a conveyor or a reel on which is mounted a hose, an electric cable or a steel cable. It should be understood, that the form of device 14 will depend on the application and that device 14 may comprise any of a wide variety of devices configured to receive an input torque. Device 14 may input rotational torque through an input member 18 such as a shaft or another rotating body such as a gear, pulley or sprocket. System 10 may further include a clutch 20 in accordance with the present invention. Clutch 20 selectively couples devices 12, 14 to provide torque output by device 12 to device 14. In particular, clutch 20 receives torque from output member 16 of device 12 and selectively transfers torque to input member 18 of device 14. It should be understood that output member 16 may be formed in device 12 or clutch 20 and, similarly, that input member 18 may be formed in device 14 or clutch 20.

Figure 2A:
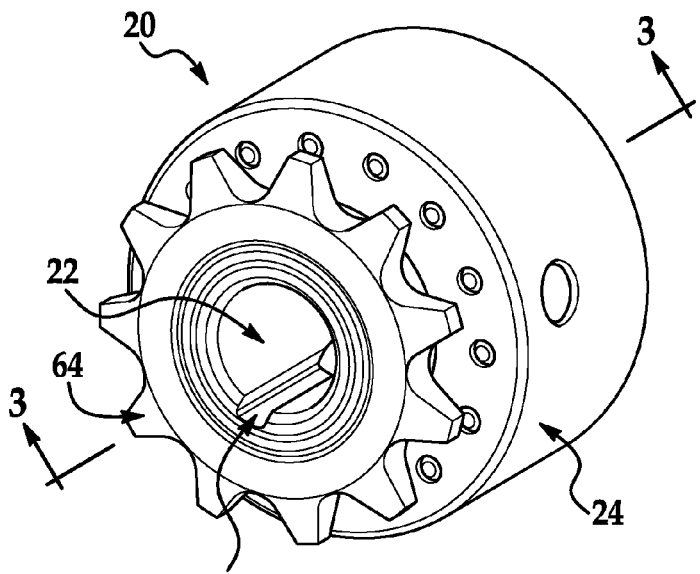
FIGS. 2A-B are perspective views of a clutch in accordance with one embodiment of the present teachings.
Figure 2B:
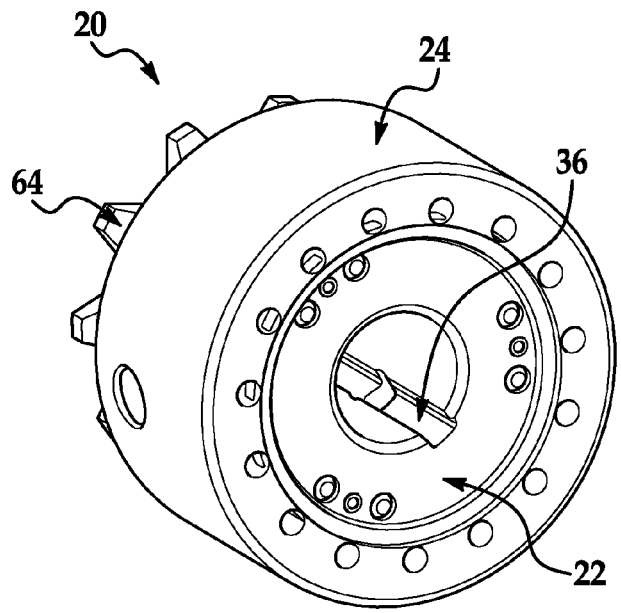
Figure 3:
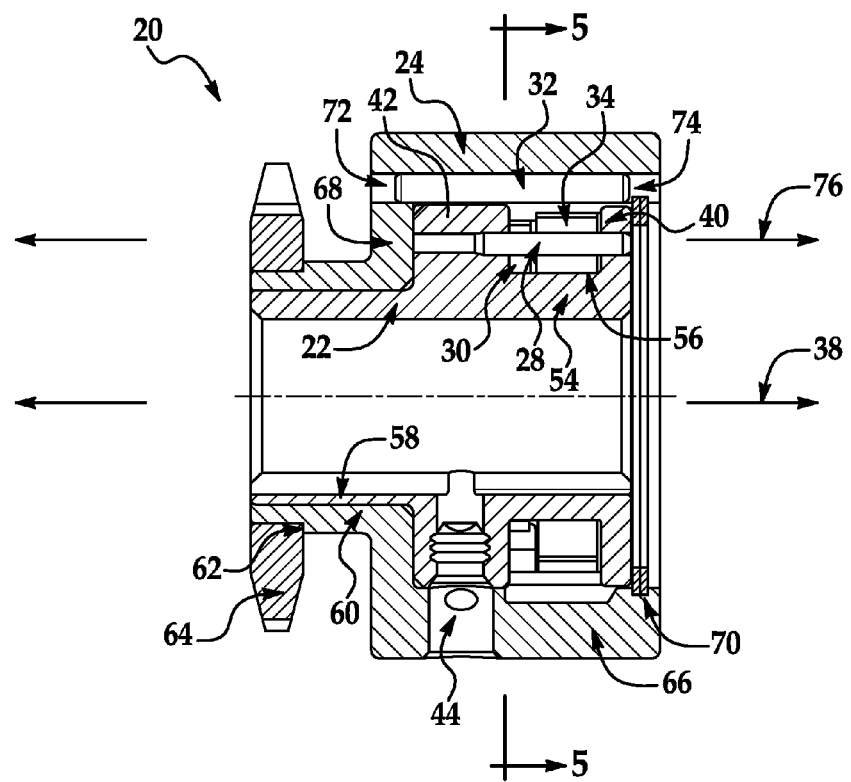
FIG. 3 is a cross-sectional view of the clutch of FIGS. 2A-B taken along lines 3-3 of FIG. 2A.
Figure 4:
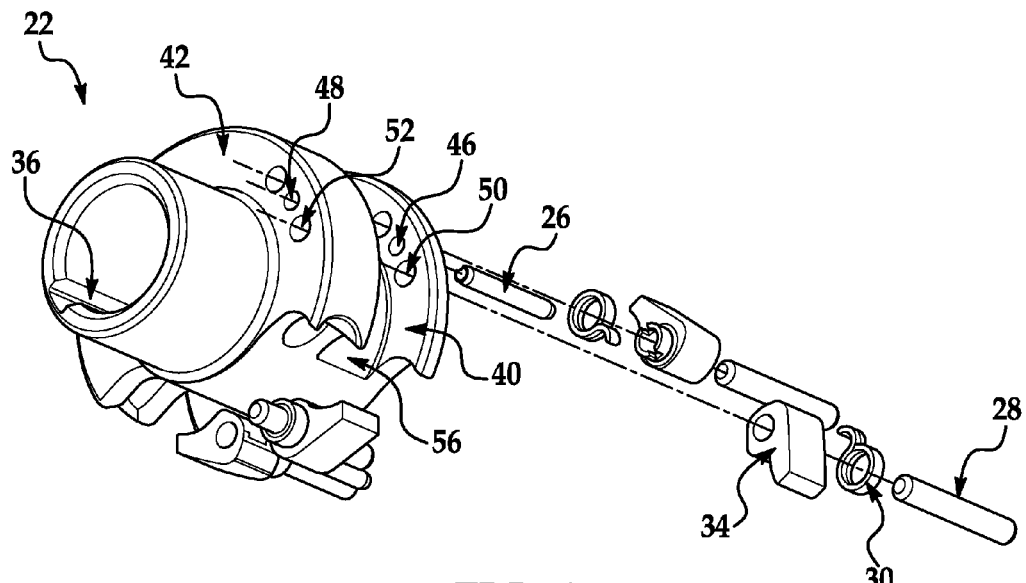
FIG. 4 is an exploded perspective view of several components of the clutch of FIGS. 2-3.

Referring now to FIGS. 2-4, one embodiment of a clutch 20 in accordance with the present invention is illustrated. Clutch 20 comprises an overrunning clutch and, in particular, a bi-directional overrunning clutch. An overrunning clutch is a type of mechanical clutch that is designed to drive in one direction while freewheeling or overrunning in the opposition direction. In the driving direction, the clutch also freewheels if the rotational speed of the driven device exceeds the rotational speed of the driving device. Bi-directional overrunning clutches are capable of driving and overrunning in both directions. One of the benefits of an overrunning clutch is that it allows for the overrunning of large inertia loads upon stopping and prevents any back-driving damage that may occur to the driving device 12. Clutch 20 may include an inner member 22, an outer member 24, a plurality of spring engagement pins 26, a plurality of mounting pins 28, a plurality of springs 30, a plurality of clutch engagement pins 32, and a plurality of pawls 34.

Inner member 22 is configured to receive an input torque from output member 16 of driving device 12 which may be selectively transferred to outer member 24 of clutch 20 as described in greater detail hereinbelow. Member 22 is annular in construction and configured to receive a shaft (not shown) extending from or to device 12 (e.g., the shaft may comprise input member 16 or may be coupled to input member 16). Member 22 may define a keyway 36 or key configured to engage a matching key or keyway, respectively, in the shaft in order to couple member 22 to the shaft for rotation about a rotational axis 38. The diameter of the radially outer surface of member 22 varies such that member 22 defines a radially outwardly extending flange 40 disposed at one axial or longitudinal end of member 22 and another radially outwardly extending flange 42 disposed intermediate the axial or longitudinal ends of member 22. Flange 42 may define one or more radially extending, circumferentially spaced passageways 44 configured to receive set screws (not shown) used to retain clutch 10 on a shaft. Referring to FIG. 4, flanges 40, 42, define axially aligned bores 46, 48 and 50, 52 configured to receive opposite longitudinal ends of pins 26, 28, respectively. Referring again to FIG. 3, a reduced diameter portion 54 of member 22 between flanges 40, 42, defines a recess 56 through which pins 26, 28, extend and which is configured to receive springs 30 and pawls 34 disposed on pins 26 and 28, respectively. Another reduced diameter portion 58 of member 22 is disposed at the opposite axial end of member 22 and configured to support a portion of outer member 24 thereon.

Outer member 24 is configured to transfer torque to driven device 14. Member 24 is annular in construction and disposed about axis 38 radially outwardly of inner member 22. Member 24 defines a reduced diameter portion 60 at one axial or longitudinal end of member 24 configured to be received on portion 58 of inner member 22. A thin film of lubricant may be disposed between portion 60 of member 24 and portion 58 of member 22. Alternatively, a bearing (e.g. sleeve bearing or roller bearing) may be disposed between members 58, 60. The diameter of the radially outer surface of portion 60 may vary to define a shoulder 62 against which a gear or sprocket 64 may be mounted for connection to input member 18 of driven device 14 either directly or, for example, through a belt. Member 24 also defines an enlarged diameter portion 66 at an opposite axial or longitudinal end of member 24. The inner diameter of portion 66 is sized to receive flanges 40, 42 of inner member 22 while allowing space for pins 32 which are disposed radially outwardly of flanges 40, 42. Portion 66 defines a pair of radially extending walls 68, 70 at opposite longitudinal ends of portion 66. Walls 68, 70, define a plurality of axially aligned, circumferentially spaced bores 72, 74, respectively, configured to receive opposite longitudinal ends of pins 32 such that a portion of each pin 32 intermediate the longitudinal ends of the pin 32 and facing pawls 34 is exposed.

Spring engagement pins 26 provide a means for retaining one end of each spring 30 such that springs 30 may be expanded and returned to an unstressed state. The longitudinal ends of pins 26 may be received within bores 46, 48, respectively, in flanges 40, 42 of inner member 22. In the illustrated embodiment, there are half as many spring engagement pins 26 as there are mounting pins 28 and the pins 26, 28 are arranged such that a single spring engagement pin 26 is disposed circumferentially between two mounting pins 28. Each spring engagement pin 26 may be configured to retain an end of two springs 30 (i.e. the end of a spring supported on each of the adjacent mounting pins 28).

Mounting pins 28 provide a means for mounting springs 30 and pawls 34 on inner member 22. The longitudinal ends of pins 26, 28 may be received within bores 48, 52, respectively, in flanges 40, 42 of inner member 22. Each mounting pin 28 is configured to support a single spring 30 and a single pawl 34 and defines an axis 76 about which the pawl 34 may pivot as discussed in greater detail hereinbelow.

Figure 5A:
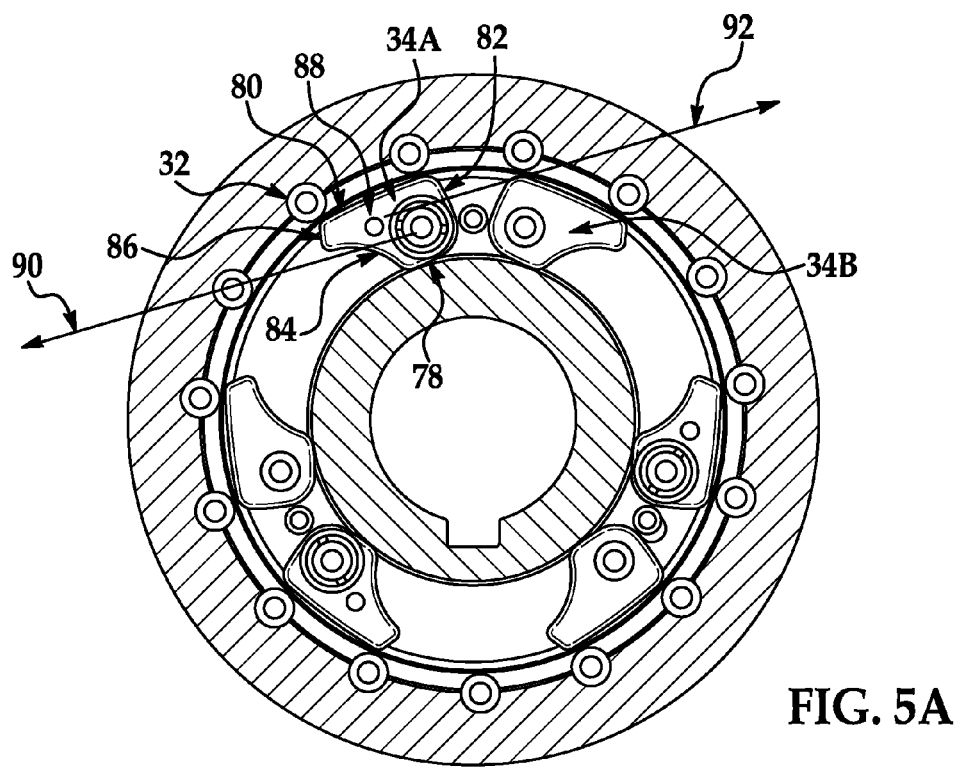
FIGS. 5A-B are cross-sectional views of the clutch of FIGS. 2-3 taken along lines 5-5 in FIG. 3 and illustrating disengagement and engagement of the clutch.

Springs 30 are provided to bias pawls 34 to a disengagement position (see FIG. 5A). Springs 30 may comprise conventional coil springs. A spring 30 may be disposed about each mounting pin 28. Referring to FIG. 4, springs 30 may be disposed on either side of a corresponding pawl 34 with the side determined by the orientation of the pawl 34. Each spring 30 may have a first end coupled to spring engagement pin 26 and a second end coupled to pawl 34. Alternative, the end coupled to spring engagement pin 26 may be coupled to a surface of member 22.

Clutch engagement pins 32 provide a means for pawls 34 to selectively engage outer member 24 in order to couple inner and outer member 22, 24 for rotation. Pins 32 may comprise dowel pins. Opposite longitudinal ends of each pin 32 are received within bores 72, 74 in walls 68, 70, respectively, of member 24 such that a rounded surface of each pin 32 intermediate the longitudinal ends of the pin 32 may be engaged by pawls 34. The use of pins 32 with rounded surfaces as opposed to conventional grooves formed in the surface of outer member 24 represents a significant improvement relative to conventional clutches. The use of pins 32 makes manufacturing of outer member 24 less complex and eliminates the need for heat treatment of the surface of member 24. The elimination of the sharp corners and edges found in typical grooves reduces stress on the clutch, thereby increasing the clutch's strength and durability and makes it easier to prevent undesirable contact between the pawls 34 and outer member 24 and any resulting damage. Further, the rounded surfaces of pins 32 make it easier to control the position of engagement by pawls 34 thereby promoting more even load sharing and a reduction in impact loads thereby reducing the size and manufacturing cost of the clutch. Further still, the use of pins 32 rather than conventional grooves reduces the clearance required to disengage the pawls 34 and therefore eliminates the need for relative motion between the inner and outer members of the clutch to disengage the clutch.

Figure 5B:
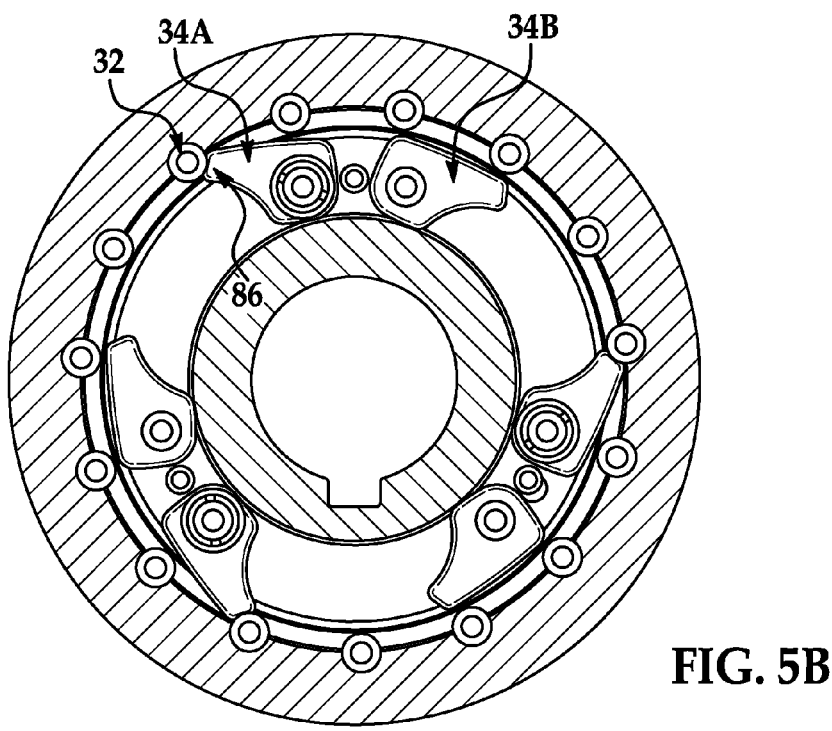

Pawls 34 are provided to engage pins 32 in order to transfer torque from inner member 22 to outer member 24. Each pawl 34 is supported on a mounting pin 28 and pivots about the rotational axis 76 extending through pin 28. Referring to FIG. 5A, each pawl 34 may, in cross-section, define radially inner and outer surfaces 78, 80 that are substantially straight and extend substantially parallel to one another. Surfaces 78, 80 extend circumferentially relative to axis 38 or axis 76 when pawl 34 is in a disengagement position as shown in FIG. 5A and the radially outer surface 80 may be longer than the radially inner surface 78. Pawl 34 may further define a surface 82 extending in a generally radial direction relative to axis 38 or axis 76 between surfaces 78, 80, that is substantially straight, but curves at either end to meet surfaces 78, 80. Pawl 34 may further define a curved, concave surface 84 having one end extending from an end of surface 78 opposite the end at which surface 78 meets surface 82. Finally, pawl 34 may define engagement surface 86 extending between the opposite end of concave surface 84 and surface 80. The engagement surface 86 may be curved and defines an arcuate segment of a circle that is concentric with the bore in pawl 34 through which mounting pin 28 extends (i.e. is centered about axis 76) thereby permitting disengagement of the clutch without relative motion between members 22, 24. Alternatively, the engagement surface 86 need not be concentric with the bore (with a resulting increase in torque density) if relative motion is acceptable for disengagement of the clutch. Although a particular configuration for pawl 34 has been described herein, it should be understood that pawl 34 could be configured in a variety of ways. Pawls 34 may be configured or shaped such that a center of gravity (illustrated by dot 88 in FIG. 5A) is offset from axis 76 and, in particular, such that a radial distance from rotational axis 38 to the center of gravity 88 is greater than a radial distance from axis 38 to the axis 76 about which pawl 34 pivots. As the rotational speed of driving device 12 increases—and therefore the rotational speed of inner member 22 of clutch 16 increases—the angular acceleration (i.e. the rate at which the speed is increasing) is transferred through mounting pins 28 to pawls 34 creating a force vector 90 having an origin at axis 76. A corresponding reaction force vector 92 is created in the opposite direction with an origin at the center of gravity 88 of the pawl 34. Because the origins are offset, the combination of the force vectors combine to cause rotation of the pawl 34 until the engagement surface 86 of pawl 34 is brought into engagement with one of pins 32 at an engagement position as shown in FIG. 5B. Once engaged, friction between the pawl 34 and pin 32 maintains engagement until the driving torque is removed. Because pawls 34 are actuated by angular acceleration rather than speed as in a centrifugal clutch or a conventional ratchet and pawl clutch, the pawls 34 engage more quickly and before the driving device 12 reaches its normally operating speed. As a result, impact loads are reduced relative to those found in conventional centrifugal and ratchet and pawl clutches and the overall size of the clutch can be reduced.

Pawls 34 are arranged two groups to provide bi-directional engagement. In particular, pairs of pawls 34A, 34B are located circumferentially adjacent to one another on mounting pins 28 that are disposed on either side of a spring engagement pin 26. The pawls 34A, 34B are arranged in opposite orientations. Rotation of member 22 in one rotational direction (counterclockwise in the illustrated embodiment) causes pawl 34A to move (by clockwise rotation about axis 76) from a disengagement position shown in FIG. 5A wherein pawl 34A is disengaged from pins 32 to permit relative rotation of the inner and outer members 22, 24 to an engagement position shown in FIG. 5B wherein pawl 34A is engaged with one of the pins 32 to cause rotation of member 24 in the same (counterclockwise) rotational direction. Because of the opposite orientation of pawl 34B, the clockwise rotation of pawl 34B imparted by force vectors 90, 92 keeps pawl 34B from moving into an engagement position. Rotation of member 22 in the opposite rotational direction (clockwise in the illustrated embodiment) causes pawl 34B to move (by counterclockwise rotation about axis 76) from a disengagement position shown in FIG. 5A wherein pawl 34B is disengaged from pins 32 to permit relative rotation of the inner and outer members 22, 24 to an engagement position wherein pawl 34B is engaged with one of the pins 32 to cause rotation of member 24 in the same (clockwise) rotational direction. Again, because of the opposite orientation of pawl 34A, the counterclockwise rotation of pawl 34A imparted by force vectors 90, 92 keeps pawl 34A from moving into an engagement position.

It should be understood that the orientation and operation of clutch 20 could be modified in several ways. For example, in the illustrated embodiment, springs 30 bias pawls 34 to a disengagement position and angular acceleration resulting from rotation of inner member 22 causes pawls 34 to move to an engagement position with pins 32. In an alternative embodiment configured for use as a backstopping clutch, springs 30 may bias pawls 34 to an engagement position while angular acceleration resulting from rotation of inner member 22 causes pawls 34 to move to a disengagement position. In this embodiment, pawls 34 are configured such that a center of gravity is offset from axis 76 and, in particular, such that a radial distance from rotational axis 38 to the center of gravity 88 is less than a radial distance from axis 38 to the axis 76 about which pawl 34 pivots. As a result, the combination of force vectors 90, 92 urges pawls 34 to a disengaged position. In one variation of this configuration, pawls 34 may all have the same orientation (as opposed to the opposite orientations of pawls 34A, 34B in the illustrated embodiment) such that the clutch may function as a backstopping clutch rather than a bi-directional overrunning clutch. The clutch would have several advantages relative to conventional sprag or ramp-roller backstopping clutch because the clutch would provide a higher torque density yet be simpler in constructions and less costly. In another alternative embodiment, pins 32 may be disposed on a radially outer surface of inner member 22 while pawls 34 are mounted on outer member 24. Pawls 34 may again be configured such that the center of gravity causes a desired rotation of pawls 34 to engage or disengage pins 32 (depending again on whether the pawls are biased to a disengagement position or engagement position, respectively).

Figure 6A:
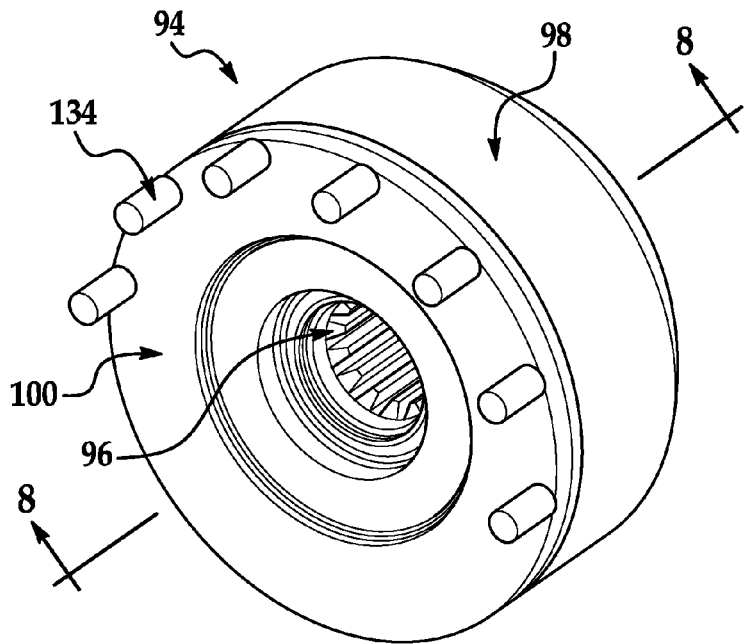
FIGS. 6A-B are perspective views of a clutch in accordance with another embodiment of the present teachings.
Figure 6B:
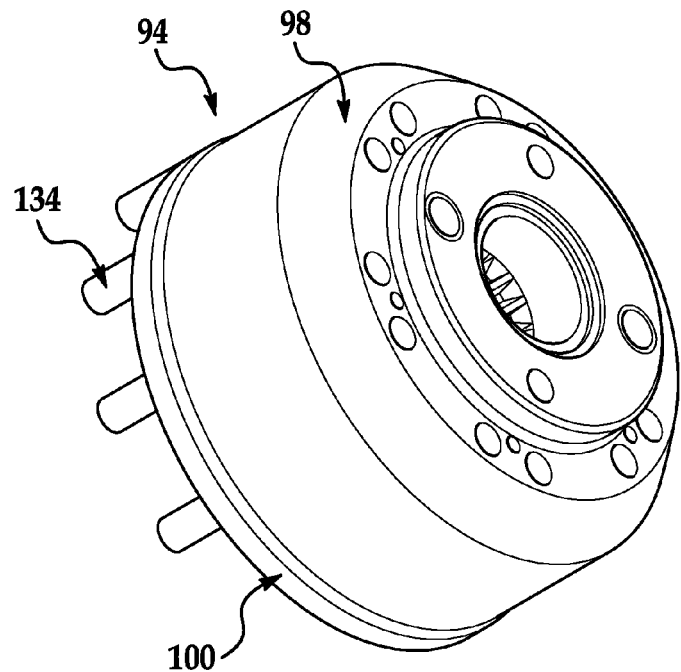
Figure 7:
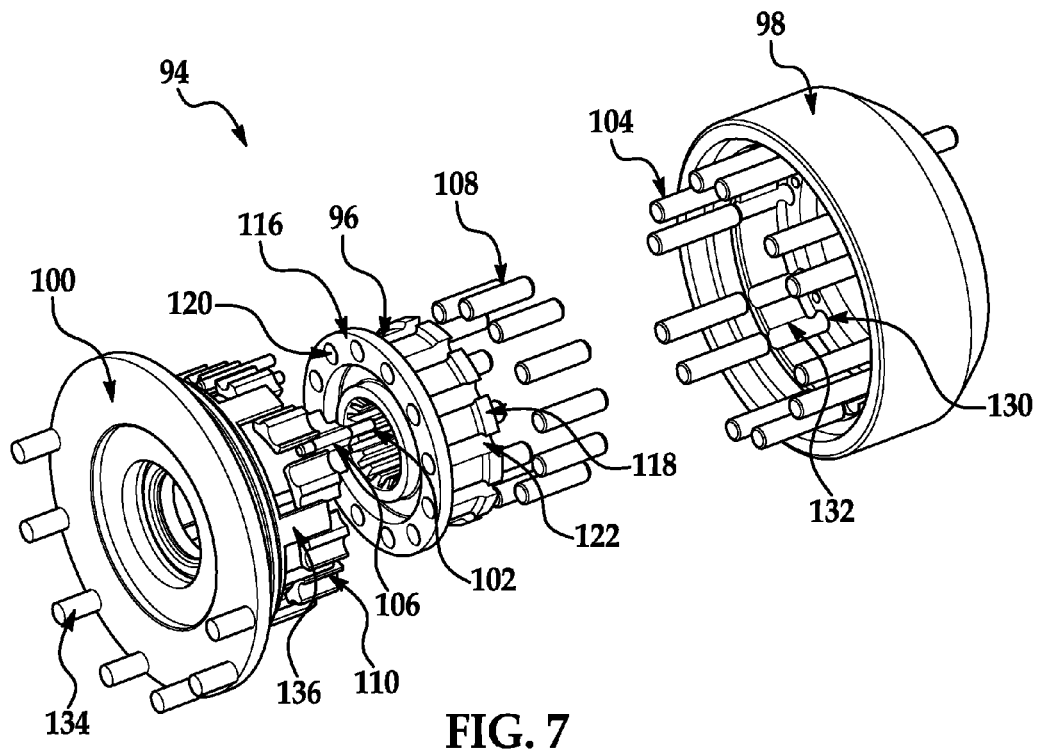
FIG. 7 is an exploded perspective view of the clutch of FIGS. 6A-B.
Figure 8:
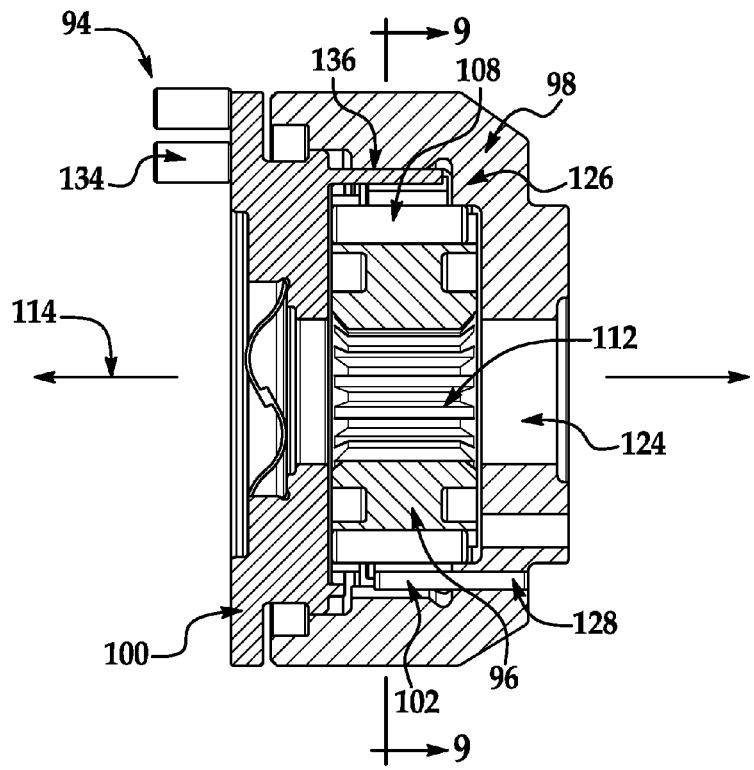
FIG. 8 is a cross-sectional view of the clutch of FIG. 6 taken along lines 8-8 in FIG. 6.

Referring now to FIGS. 6-8, a clutch 94 in accordance with another embodiment of the present invention is illustrated. Clutch 94 may include an inner member 96, an outer member 98, an actuator 100, a plurality of spring engagement pins 102, a plurality of mounting pins 104, a plurality of springs 106, a plurality of clutch engagement pins 108, and a plurality of pawls 110. Clutch 94 is intended for use in lower speed applications as compared to clutch 20 wherein assistance may be required to move pawls 110 from a disengagement position to an engagement position.

Inner member 96 is configured to transfer torque to input member 18 of driven device 14. Member 96 is annular in construction and configured to receive a shaft (not shown) extending from or to device 14 (e.g., the shaft may comprise output member 18 or may be coupled to input member 18). Member 96 may define a plurality of splines 112 (see FIG. 6) configured to engage a matching set of splines in the shaft in order to couple member 96 to the shaft for rotation about a rotational axis 114. The diameter of the radially outer surface of member 96 varies such that member 96 defines radially outwardly extending flanges 116, 118 disposed at opposite axial or longitudinal ends of member 96. Flanges 116, 118, define a plurality of axially aligned, circumferentially spaced bores 120, 122 respectively, configured to receive opposite longitudinal ends of pins 108 such that a portion of each pin 108 intermediate the longitudinal ends of the pin 108 and facing pawls 110 is exposed.

Outer member 98 is configured to receive an input torque from output member 16 of driving device 12 which may be selectively transferred to inner member 96 of clutch 94 as described in greater detail hereinbelow. Member 98 is annular in construction and configured to receive inner member 96 and a portion of actuator 100 therein. Member 98 is disposed about axis 114 radially outwardly of inner member 96. Member 98 defines a bore 124 configured to receive a shaft (not shown) extending from or to device 12 (e.g., the shaft may comprise input member 16 or may be coupled to input member 16). It should be understood, however, that member 98 may alternatively include a driven gear or pulley attached to outer member 98. Member 98 is further configured to receive spring engagement pins 102 and mounting pins 104. In particular, a radially extending wall 126 defines bores 128, 130 configured to receive one longitudinal end of pins 102, 104, respectively. The radially inner surface of member 98 further defines a plurality of longitudinally or axially extending recesses 132 configured to receive pins 104.

Actuator 100 is provided to force pawls 110 into engagement with pins 108 upon rotation of outer member 98 in response to a driving torque provided by driving device 12 or in response to an external force acting on actuator 100. Actuator 100 is annular in construction and disposed about axis 114. A plurality of magnets 134 may extend from one side of actuator 100 for use in creating relative rotation between actuator 100 and outer member 98 (e.g. by application of an external force). A plurality of tangs 136 extend from the opposite side of actuator 100 and are received within outer member 98. In particular, and with reference to FIGS. 9A-B, tangs 136 are disposed circumferentially between two pawls 110 such that, upon relative rotation between outer member 98 and actuator 100, tangs 136 engage pawls 110 and urge pawls 110 into engagement with pins 108. Although tangs 136 appear substantially rectilinear in cross-section in the illustrated embodiment, it should be understood that the shape of tangs 136 may be varied and may, for example, comprise rounded pins. Actuator 100 may be placed in frictional engagement with a stationary member in driving or driven devices 12, 14 or another stationary object such that rotation of outer member 98 results in a period of relative rotation wherein pawls 110 are brought into engagement with tangs 136 by virtue of rotation of outer member 98. Upon engagement of pawls 110 with tangs 136, actuator 100 rotates with outer member 98. Actuator 100 may be placed in frictional engagement with the stationary member by electromagnetic force or magnetic force, fluid force or spring force. Actuator 100 may be returned to this position when driving torque is no longer provided by the actions of springs 106 which force pawls 110, and therefore tangs 136 back to a disengaged position. Alternatively, a separate spring (not shown) or reverse rotation of member 98 can be used to return actuator 100 to a position where tangs 136 are disengaged from pawls 110.

Spring engagement pins 102 provide a means for retaining springs 106 such that springs 106 may be expanded and returned to an unstressed state. The longitudinal ends of pins 102 may be received within bores 128 in wall 126 of outer member 98. In the illustrated embodiment, there are half as many spring engagement pins 102 as there are mounting pins 104 and the pins 102, 104 are arranged such that a single spring engagement pin 102 is disposed circumferentially between two mounting pins 104.

Mounting pins 104 provide a means for mounting pawls 110 on outer member 98. The longitudinal ends of pins 104 may be received within bores 130 in wall 126 of outer member 98 and may be press fit within bores 130. Each mounting pin 104 is configured to support a single pawl 110 and defines an axis about which the pawl 110 may pivot as discussed in greater detail hereinbelow.

Figure 9A:
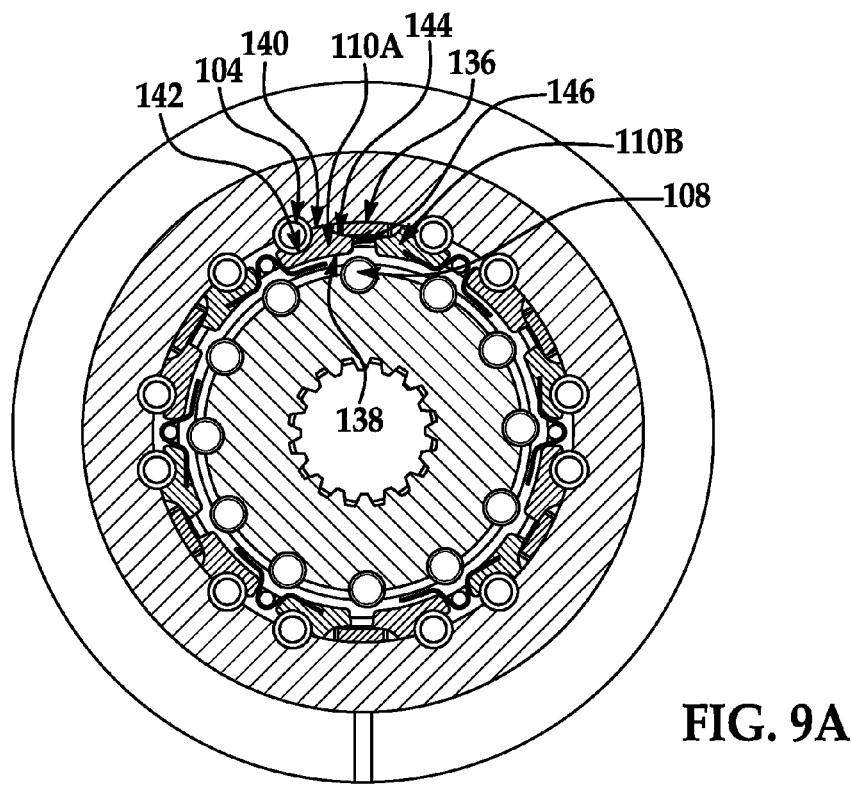
FIGS. 9A-B are cross-sectional views of the clutch FIGS. 6-8 taken along lines 9-9 in FIG. 8 and illustrating disengagement and engagement of the clutch.
Figure 9B:
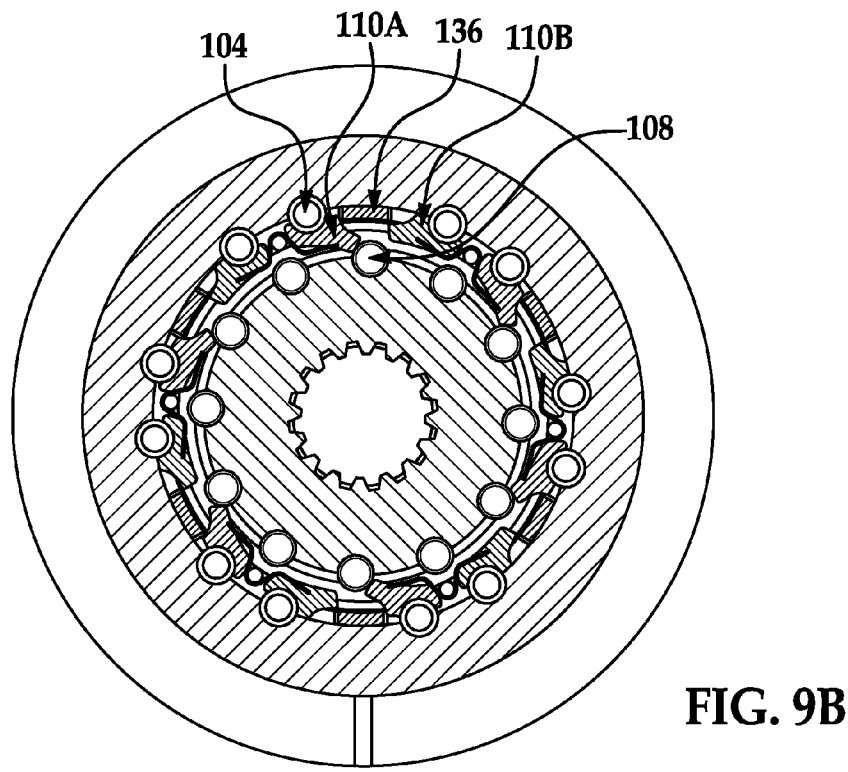
Figure 10:
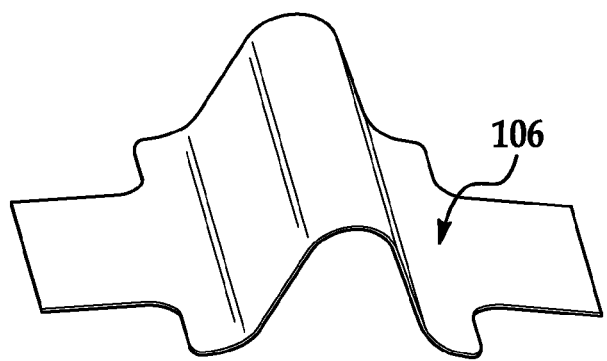
FIG. 10 is a perspective view of a spring used in the clutch of FIGS. 6-8.
Figure 11:
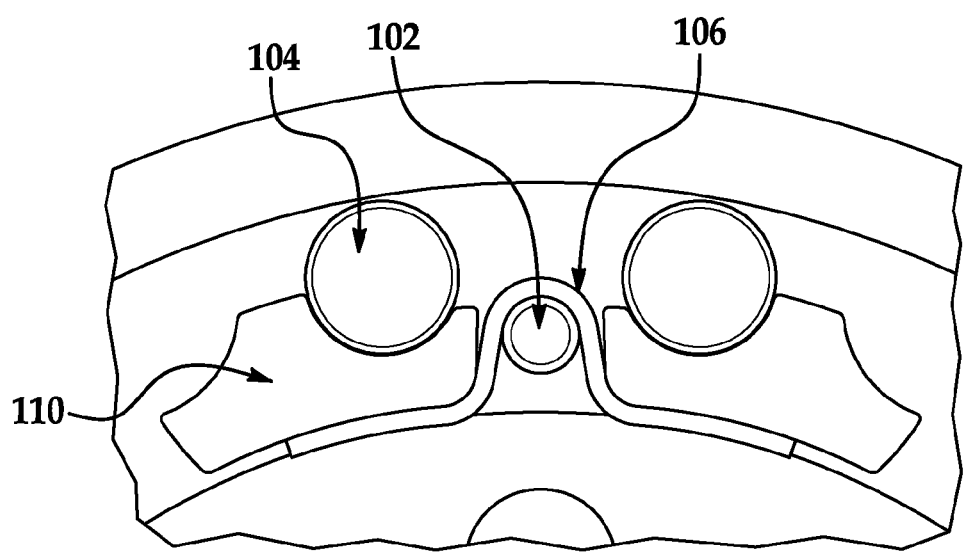
FIG. 11 is an enlarged cross-sectional view of a portion of the clutch of FIGS. 6-8.

Springs 106 are provided to bias pawls 110 to a disengagement position (see FIG. 9A). Referring to FIGS. 10-11, springs 106 may comprise a leaf spring having a radially inner side configured to receive pin 102 and a radially outer side configured to engage pawls 110 on either side of pin 102 to retain pawls 110 and bias pawls 110 to a disengagement position. Engagement of a pawl 110 by a tang 136 of actuator 100 urges the pawl 110 to an engagement position (see FIG. 9B) against the force of spring 106. It should be understood that springs 106 may assume a variety of forms. For example, springs 106 may comprise coil springs disposed about mounting pins 104 and coupled at one end to a corresponding pawl 110 and at another end to a spring engagement pin as in clutch 20 or to a surface of member 98.

Clutch engagement pins 108 provide a means for pawls 110 to selectively engage inner member 96 in order to couple inner and outer member 96, 98 for rotation. Pins 108 may comprise dowel pins. Opposite longitudinal ends of each pin 108 are received within bores 120, 122 in flanges 116, 118, respectively, of member 96 such that a rounded surface of each pin 108 intermediate the longitudinal ends of the pin 108 may be engaged by pawls 110. Again, the use of pins 108 with rounded surfaces as opposed to conventional grooves formed in the surface of inner member 96 represents a significant improvement relative to conventional clutches. The use of pins 108 makes manufacturing of inner member 96 less complex and eliminates the need for heat treatment of the surface of member 96. The elimination of the sharp corners and edges found in typical grooves reduces stress on the clutch, thereby increasing the clutch's strength and durability and makes it easier to prevent undesirable contact between the pawls 110 and inner member 96 and any resulting damage. Further, the rounded surfaces of pins 108 make it easier to control the position of engagement by pawls 110 thereby promoting more even load sharing and a reduction in impact loads thereby reducing the size and manufacturing cost of the clutch. Further still, the use of pins 108 rather than conventional grooves reduces the clearance required to disengage the pawls 110 and therefore eliminates the need for relative motion between the inner and outer members of the clutch to disengage the clutch.

Pawls 110 are provided to engage pins 108 in order to transfer torque from outer member 98 to inner member 96. Each pawl 110 is supported on a mounting pin 104 and pivots about the rotational axis extending through pin 104. Referring to FIG. 9A, each pawl 110 may, in cross-section, define radially inner and outer surfaces 138, 140 that are substantially straight and extend substantially parallel to one another. Surfaces 138, 140 extend circumferentially relative to axis 114 and the rotational axis of mounting pin 104 when pawl 110 is in a disengagement position as shown in FIG. 9A. The radially outer surface 140 is shorter than the radially inner surface 138 and is located intermediate the circumferential ends of the pawl 110. Pawl 110 further defines a concave surface 142 configured to receive mounting pin 104 and that is disposed on one circumferential side of outer surface 140. Pawl 110 further defines a curved or arcuate surface 144 configured to engage a tang 136 on actuator 100 that is disposed on the opposite circumferential side of outer surface 140. Pawl 110 further defines an engagement surface 146 extending between curved surface 144 and outer surface 140. The engagement surface 146 may be curved and defines an arcuate segment of a circle that is concentric with a circle defined by surface 142 centered about the axis extending through pin 104 thereby permitting disengagement of the clutch without relative motion between members 96, 98. Alternatively, the engagement surface 146 need not be concentric with surface 142 (with a resulting increase in torque density) if relative motion is acceptable for disengagement of the clutch. Although a particular configuration for pawl 110 has been described herein, it should again be understood that pawls 110 could be configured in a variety of ways. As referenced hereinabove, upon rotation of outer member 98 in response to a driving torque, relative motion is created between outer member 98 and actuator 100. As shown in FIG. 9B, surface 144 engages a corresponding tang 136 forcing pawl 110 to pivot about a rotational axis of mounting pin 104. This action forces engagement surface 146 into engagement with pin 108 to transfer torque to inner member 96 and driven device 14. Once engaged, friction between the pawl 110 and pin 108 maintains engagement until the driving torque is removed or an overrunning condition occurs. Springs 106 then urge pawls 110 back to a disengagement position as shown in FIG. 9A.

Pawls 110 are again arranged in two groups to provide bi-directional engagement. In particular, pairs of pawls 110A, 110B are located circumferentially adjacent to one another on mounting pins 104 that are disposed on either side of a spring engagement pin 102. The pawls 110A, 110B are arranged in opposite orientations. Rotation of member 98 in one rotational direction (clockwise in the illustrated embodiment) causes pawl 110A to move (by clockwise rotation about the axis of pin 104) from a disengagement position shown in FIG. 9A wherein pawl 110A is disengaged from pins 108 to permit relative rotation of the inner and outer members 96, 98 to an engagement position shown in FIG. 9B wherein pawl 110A is engaged with one of the pins 108 to cause rotation of member 96 in the same (clockwise) rotational direction. Rotation of member 98 in the opposite rotational direction (counterclockwise in the illustrated embodiment) causes pawl 110B to move (by counterclockwise rotation about the axis of pin 104) from a disengagement position shown in FIG. 9A wherein pawl 110B is disengaged from pins 108 to permit relative rotation of the inner and outer members 96, 98 to an engagement position wherein pawl 110B is engaged with one of the pins 108 to cause rotation of member 96 in the same (counterclockwise) rotational direction.

An overrunning clutch 20 or 94 in accordance with the present invention is advantageous relative to conventional electrical, fluid or manually actuated clutches because the clutch 20 or 94 is less complex and less costly. The clutch 20 or 94 is also advantageous relative to conventional mechanically actuated clutches. As compared to conventional centrifugal clutches, no sliding friction is created thereby reducing heat and wear on the clutch. Further, because the inventive clutch 20 or 94 is not dependent on the speed of the driving device, the clutch is smaller than conventional centrifugal clutches while transmitting the same torque. As compared to conventional ratchet and pawl clutches, the inventive clutch does not require sharp grooves in the surface of one of the clutch members nor relative motion between the clutch members to allow the pawls to clear the grooves. As a result, the clutch 20 or 94 is easier and less costly to manufacture and suffers less stress upon engagement. Further, the pawls 34 of 110 engage the pins 32 or 108 at a relatively precise location thereby insuring relatively equal load sharing.

While the invention has been shown and described with reference to one or more particular embodiments thereof, it will be understood by those of skill in the art that various changes and modifications can be made without departing from the spirit and scope of the invention.

I claim:

1. An overrunning clutch, comprising:
   an inner member disposed about a first rotational axis
   an outer member disposed about said first rotational axis radially outward of said inner member
   a plurality of cylindrical pins projecting from, and fixed against circumferential movement relative to, one of a radially inner surface of said outer member and a radially outer surface of said inner member;
   a first pawl coupled to one of said inner and outer members, said first pawl movable between a first engagement position wherein said first pawl contacts a first pin of said plurality of pins to transmit torque between said inner and outer members and a first disengagement position wherein said first pawl does not contact said first pin to permit relative rotation of said inner and outer members.

2. The overrunning clutch of claim 1 wherein said inner member is coupled to a driving device and said outer member is coupled to a driven device.

3. The overrunning clutch of claim 1 wherein said outer member is coupled to a driving device and said inner member is coupled to a driven device.

4. The overrunning clutch of claim 1 wherein said first pawl engages a rounded surface of said first pin intermediate first and second longitudinal ends of said first pin when said first pawl is in said first engagement position.

5. The overrunning clutch of claim 1 wherein said first pawl is supported on a mounting pin extending from said one member, said mounting pin defining a pivot point for said first pawl.

6. The overrunning clutch of claim 1 further comprising a spring biasing said first pawl to one of said first engagement position and said first disengagement position.

7. The overrunning clutch of claim 1 wherein said first pawl pivots about a second rotational axis and a center of gravity of said first pawl is offset from said second rotational axis.

8. The overrunning clutch of claim 7 wherein a radial distance from said first rotational axis to said center of gravity is greater than a radial distance from said first rotational axis to said second rotational axis.

9. The overrunning clutch of claim 1 further comprising an actuator disposed between said inner and outer members, said actuator configured to engage said first pawl upon rotation of said one member and urge said first pawl towards said first engagement position.

10. The overrunning clutch of claim 1 wherein said first pawl defines an engagement surface configured to engage said first pin, said engagement surface defining an arcuate portion of a circle centered on a second rotational axis about which said first pawl rotates.

11. An overrunning clutch, comprising:
    an inner member disposed about a first rotational axis
    an outer member disposed about said first rotational axis radially outward of said inner member
    a plurality of pins projecting from one of a radially inner surface of said outer member and a radially outer surface of said inner member;
    a first pawl coupled to one of said inner and outer members, said first pawl movable between a first engagement position wherein said first pawl contacts a first pin of said plurality of pins to transmit torque between said inner and outer members and a first disengagement position wherein said first pawl does not contact said first pin to permit relative rotation of said inner and outer members; and,
    a second pawl coupled to said one member, said second pawl movable between a second engagement position wherein said second pawl is engaged with one of said first pin and a second pin of said plurality of pins to transmit torque between said inner and outer members and a second disengagement position wherein said second pawl is disengaged from said one pin to permit relative rotation of said inner and outer members.

12. The overrunning clutch of claim 11 wherein rotation of said one member in a first rotational direction causes said first pawl to assume said first engagement position and said second pawl to assume said second disengagement position.

13. The overrunning clutch of claim 12 wherein rotation of said one member in a second rotational direction opposite said first rotational direction causes said first pawl to assume of said first disengagement position and said second pawl to assume said second engagement position.

14. An overrunning clutch, comprising:
    an inner member disposed about a first rotational axis;
    an outer member disposed about said first rotational axis radially outward of said inner member;
    a plurality of pins projecting from one of a radially inner surface of said outer member and a radially outer surface of said inner member;
    a first pawl coupled to one of said inner and outer members, said first pawl movable in response to rotation of said one member in a first rotational direction from a first disengagement position wherein said first pawl is not in contact with any of said plurality of pins to permit relative rotation of said inner and outer members to a first engagement position wherein said first pawl contacts a first pin of said plurality of pins to cause rotation of another member of said inner and outer members in said first rotational direction;
    a second pawl coupled to said one member, said second pawl movable in response to rotation of said one member in a second rotational direction opposite said first rotational direction from a second disengagement position wherein said second pawl is not in contact with any of said plurality of pins to permit relative rotation of said inner and outer members to a second engagement position wherein said second pawl contacts one of said first pin and a second pin of said plurality of pins to cause rotation of said another member in said second rotational direction.

15. The overrunning clutch of claim 14 wherein said inner member is coupled to a driving device and said outer member is coupled to a driven device.

16. The overrunning clutch of claim 14 wherein said outer member is coupled to a driving device and said inner member is coupled to a driven device.

17. The overrunning clutch of claim 14 wherein said first pawl engages a rounded surface of said first pin intermediate first and second longitudinal ends of said first pin when said first pawl is in said first engagement position.

18. The overrunning clutch of claim 14 wherein said first and second pawls are supported on mounting pins extending from said one member, said mounting pins defining pivot points for said first and second pawls.

19. The overrunning clutch of claim 14 further comprising a first spring biasing said first pawl to one of said first engagement position and said first disengagement position and wherein one of said first spring and a second spring biases said second pawl to one of said second engagement position and said second disengagement position.

20. The overrunning clutch of claim 14 wherein said first pawl pivots about a second rotational axis and a center of gravity of said first pawl is offset from said second rotational axis and said second pawl pivots about a third rotational axis and a center of gravity of said second pawl is offset from said third rotational axis.

21. The overrunning clutch of claim 20 wherein a radial distance from said first rotational axis to said center of gravity of said first pawl is greater than a radial distance from said first rotational axis to said second rotational axis and a radial distance from said first rotational axis to said center of gravity of said second pawl is greater than a radial distance from said first rotational axis to said third rotational axis.

22. The overrunning clutch of claim 14 further comprising an actuator disposed between said inner and outer members, said actuator configured to engage said first pawl upon rotation of said one member in said first rotational direction and urge said first pawl towards said first engagement position and configured to engage said second pawl upon rotation of said one member in said second rotational direction and urge said second pawl towards said second engagement position.

23. The overrunning clutch of claim 14 wherein said first pawl defines an engagement surface configured to engage said first pin, said engagement surface defining an arcuate portion of a circle centered on a second rotational axis about which said first pawl rotates.

* * * * *